Jan. 22, 1946.  H. B. SCHULTZ  2,393,571
REGULATOR OR UNLOADING VALVE FOR FLUID PRESSURE SYSTEMS
Filed Dec. 16, 1942
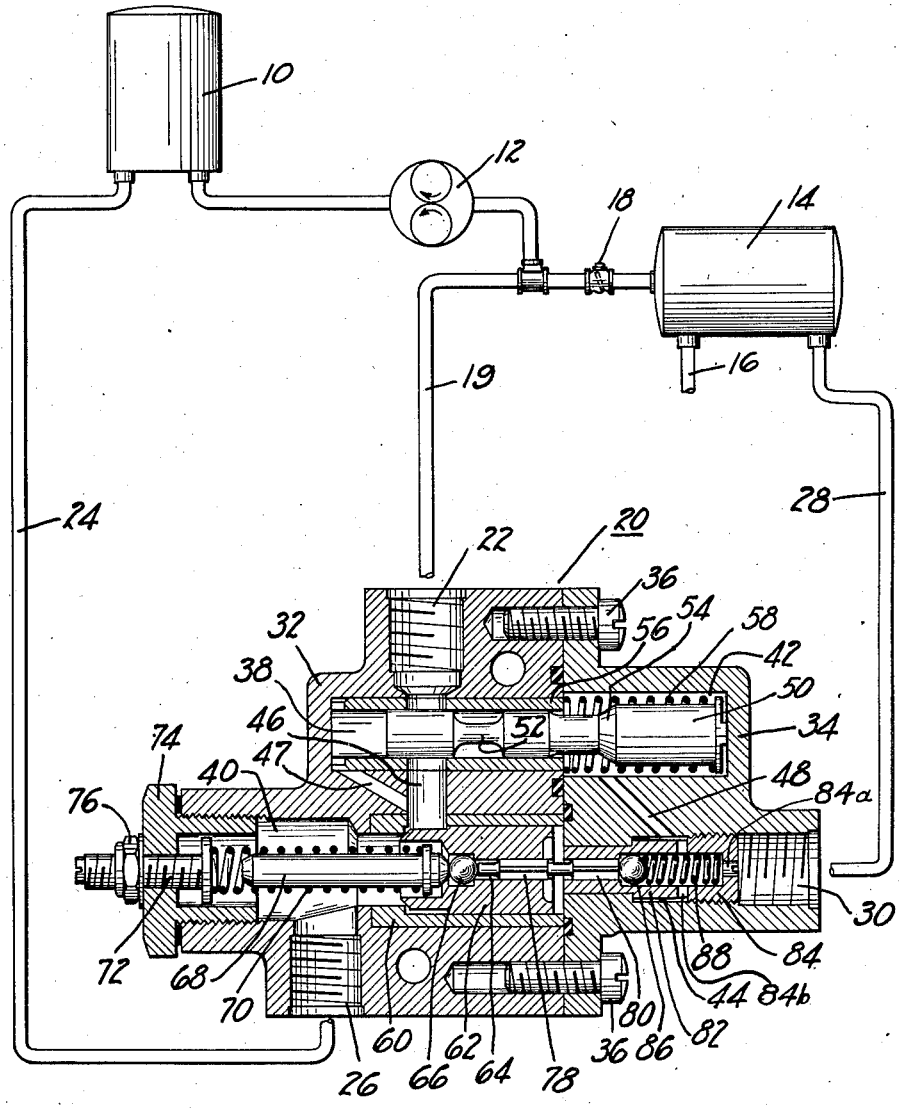
INVENTOR
HAROLD B. SCHULTZ
BY
A. R. McCrady Patented Jan. 22, 1946

2,393,571

UNITED STATES PATENT OFFICE 2,393,571

REGULATOR OR UNLOADING VALVE FOR FLUID PRESSURE SYSTEMS

Harold B. Schultz, South Bend, Ind., assignor to Bendix Aviation Corporation, South Bend, Ind., a corporation of Delaware Application December 16, 1942, Serial No. 469,191

8 Claims. (Cl. 137—153)

This invention concerns valves of the type embraced in my copending application Serial No. 445,629, filed June 3, 1942, and relates generally to valves, particularly to a regulator or unloading valve of the type which may be employed in a fluid pressure system, and particularly to the type of valve which may be employed in a fluid pressure system such as is commonly used in aircraft.

In such systems, it is necessary to maintain the fluid pressures between very close limits of upper pressure and lower pressure, so that the various fluid operated devices used in the aircraft may be operated at optimum conditions.

It is also generally the practice to employ, for maintaining pressure in such a fluid pressure system, a pump which is directly connected to some power take-off from the aircraft engine. It is not ordinarily expedient to connect and disconnect the pump from the power take-off when the lower pressure limit is attained and when the upper pressure limit is attained, but it is generally the practice to have the pump operate continuously, a valve being ordinarily employed to cause the pump to operate against little or no pressure head when the upper limit of pressure is attained, the valve being operable to connect the pump to an accumulator or other pressure storage vessel when the lower limit of pressure is attained.

With the foregoing problems in mind it is an object of this invention to provide a regulator or unloading valve for such a fluid pressure system which will operate, if desired, within close limits, insuring that the fluid pressure system is maintained within close limits of pressure, or between any desired limits of pressure.

Another object is to provide such a valve which, when in the open position, will offer little resistance to fluid flow, so that the head against which the pump must operate will be kept to a minimum.

Another object is to provide a valve of the type mentioned which will make unnecessary the requirement of close limits of concentricity or alignment between various of the valve elements.

A still further object is to provide such a valve which will not be subject to hydraulic hammer when the valve is suddenly opened to by-pass, as has been sometimes experienced in valves of this type known to the prior art.

Yet another object is to provide a regulator or unloading valve which will be more sensitive and positive in action at the low limit of regulating range.

A still further object is to provide a regulator or unloading valve for such a system which will be light in weight and simple to manufacture.

These and other objects of the invention are pointed out in the following description in terms of the embodiment thereof which is shown in the accompanying drawing. It is to be understood, however, that the drawing is for the purpose of illustration only and is not designed as a definition of the limits of the invention, reference being had to the subjoined claims for this purpose.

In the single drawing there is shown an accumulator or fluid pressure system, particularly of the type employed in aircraft, the regulator valve which forms a part of this invention being shown in longitudinal section.

The accumulator system shown comprises a reservoir 10 which is connected as shown to a pump 12 which supplies fluid under pressure to an accumulator 14 wherein it is stored preparatory to being supplied to various hydraulically actuated devices connected to the conduit 16. A check valve 18 is placed in the conduit between the pump 12 and the accumulator 14 and serves to prevent flow in the reverse direction from the accumulator 14 to the pump 12. A second conduit 19 connects the regulator valve 20 to the pump 12 at the port 22, and an exhaust conduit 24 is connected between an exhaust port 26 of the valve 20 and the reservoir 10. Leading from the accumulator 14 is a conduit 28 which is connected to the valve 20 at a control port 30.

The operating parts of the valve 20 are housed within a body made up of two body members 32 and 34 which are held together by the cap screws 36 as shown. A pair of parallel bores 38 and 40 in the body member 32 are coaxial with a second pair of parallel bores 42 and 44 in the body member 34. A passage 46 connects the inlet port 22 with the bore 40, and a passage 48 connects the bore 42 with the bore 44. An inclined passage 47 connects the passage 46 with the left-hand end of the bore 38.

Adapted at times to prevent the ingress of pumped fluid to the valve 20 and within the bores 38 and 42 is a shiftable valve member 50 which has a constricted portion 52, and which has a tapered portion 54 which is adapted at times to seat against a liner 56 in the body member 32. The member 50 is biased to the right as shown by the spring 58. At times for permitting the flow of pumped fluid through the valve 20 back to the reservoir 10 there is provided within the bore 40 and a liner 60 a movable plunger 62 which is adapted to seat at a shouldered portion of the liner 60, and which has a drilled passage 64 therein of varying diameters as shown. At the juncture of the smallest diameter with a larger diameter a ball 66 is adapted at times to be seated and is urged to the right by a pilot 68 and a spring 70 which abuts an adjusting screw 72 which is threaded into a hollow cap nut 74. The adjusting screw is held against movement by an annular nut 76.

In contact with the ball 66 is a slotted push rod 78 which in turn contacts a second push rod 80 whose slotted portion is larger in cross-sectional area than that of the slotted push rod 78. The push rod 80 is slidable in a seat member 82 which is held in position by a slotted and drilled member 84 which is threaded into the control port 30. The seat member 82 is arranged to provide a seat for the ball 86 which is biased to the left by a spring 88 which abuts the member 84. The chamber thus formed by the bore 44, member 84, and seat member 82, is open to pressure at the control port 30 through the drilled portions 84a and the slotted portion 84b in the member 84, and the pressure is communicated through the passage 48 to the member 50.

As shown, the seat for the ball 66 is smaller in area than the seat for the ball 86.

The operation of the valve thus far described is as follows:

Assuming no residual pressure in the accumulator 14, it having been vented to atmosphere for some reason, the position of the shiftable member 50 will be that shown in the drawing, and the position of the plunger 62 will be such that its right end bottoms against the body member 34. The shiftable member occupies the position shown in the drawing to prevent the passage of the fluid through the valve 20 until the pressure in the accumulator 14 is sufficient to force the plunger 62 to its seat on the liner 60 to start the normal operating cycle. With the plunger 62 seated, the pressure continues to build up in the port 30, the bore 44, and the chamber formed behind the plunger 62. Again with the plunger 62 seated, the pressure from the accumulator 14 continues to build up until it is sufficient to force the push rods 80 and 78, ball 66 and the pilot 68 to the left against the spring 70, permitting the ball 86 to seat. At this time ball valve 66 is unseated and the pressure in the chamber behind the plunger 62 is bled through the slot in the push rod 78. This causes a differential pressure to be created across the plunger 62, to unseat it to the right and permit the pump output to unload through the valve 20 and back to the reservoir 10.

Concurrent with the admission of pressure at the control port 30 pressure is built up in bore 42 tending to urge member 50 to the left until the pressure caused by any residual fluid in bore 38 is balanced by the pressure on the faces of the right-hand part of the member 50 minus the load in spring 58 which is very small. As soon as the member 62 moves to the right as explained before, the pressure in the passage 47 and the passage 46 will be bled to the reservoir 10, through the exhaust conduit 24, and the pressure in passage 48 will move the shiftable member 50 to the left until the constricted portion 52 of the member 50 is in register with the passage 46 and the inlet port 22.

However, when fluid operated devices connected to the accumulator 14 by the conduit 16 are operated, the pressure within the accumulator 14 drops. To build up the pressure within the accumulator the valve must now close, that is, the plunger 62 must occupy the position shown in the drawing. The operation of the valve to return to the closed position is as follows:

With the pressure at the control port insufficient to maintain ball 86 seated against the force of spring 70, the ball 66 will be moved against its seat, and the intervening push rod members 78 and 80 will unseat ball valve 86. The cross-sectional area of the groove in push rod 80 being greater than the cross-sectional area of the groove in push rod 78, pressure will immediately be built up in the chamber behind the plunger 62 causing it to seat, and the pump will again be closed to by-pass, and will be forced to build up the pressure in the accumulator. When the pressure in the accumulator builds up, the valve will operate as described before, alternately connecting the pump to by-pass and to the accumulator.

Since the spring 58 which urges the shiftable member 50 to the right is very weak the shiftable member 50 will occupy a position where the left-hand of said member bottoms against the body member 32, thereby maintaining the restricted portion 52 in register with the inlet port 22 and the passage 46. Only at such times as the system is at atmospheric pressure will the member 50 be in the position shown in the drawing. It will be seen, therefore, that the member 50 serves only to initiate a succession of operating cycles for the valve 20 after the system has been vented to atmosphere and subsequently been put into operation.

It will be seen that the valve just described may be adjusted to start the unloading operation at any desired pressure value by merely changing the load on spring 70. The range between which the valve loads and then begins to unload may be varied by changing the diameters of the seats for the ball valves 66 and 86. Thus by holding the diameter of the seat for ball valve 66 constant and making the seat for ball valve 86 larger, the range between loading and unloading may be increased. So too, by holding the area of the seat for ball valve 86 constant and making the area of the seat of ball valve 66 smaller or larger the operating range may be increased or decreased. It is to be noted, however, that the seat area for ball valve 86 must always be larger than the seat area for ball valve 66.

Another advantage to be found in the valve described above lies in the fact that it will operate without hammer when moving to the loading or unloading position. The slots in push rods 78 and 80 restrict and impede the flow of the fluid, so at no time will the pressure behind the plunger 62 be bled with sufficient rapidity that it will hammer against the valve body member 34, and so that at no time will pressure be supplied behind the plunger to cause it to move too rapidly against its seat on the liner 60.

Although the foregoing description is necessarily of a detailed character in order to completely set forth the invention, it is to be understood that the specific terminology is not intended to be restrictive or confining, and it is to be further understood that various rearrangements of parts and modifications of structural detail may be made without departing from the scope or spirit of the invention as herein claimed.

I claim:

1. A regulator valve for a fluid pressure system comprising a body having inlet and outlet ports and a control port, a pair of spaced bores in said body in communication with said ports, a member slidable in one of said bores to permit entrance of the fluid to the valve body and normally biased to prevent ingress of fluid to the valve, means responsive to pressure adjacent to control port for moving said slidable member in a direction to permit ingress of fluid to the valve, a plunger movable in the other of said bores and adapted to open said valve to the outlet port in response to a pressure differential across the faces of said plunger, means interposed the control port and the outlet port adapted to create a differential pressure across said plunger to move the same to connect said valve to outlet, said plunger being moved to connect said valve to outlet only after said means responsive to pressure in the control port for moving said slidable member has moved the same in a direction to permit ingress of fluid to the valve.

2. A regulator valve comprising a body having inlet and outlet ports and a control port, a passageway interconnecting the inlet and outlet ports, a spring closed valve controlling the passageway and opening in response to a predetermined pressure at the control port, a pressure actuated second valve in the passageway posterior to the first named valve, said second valve being urged toward open position by the pressure in the passageway and toward closed position by a variable pressure, and means responsive to the pressure at the control port for varying the pressure acting to close the second valve.

3. A regulator valve comprising a body having inlet and outlet ports and a control port, a passageway interconnecting the inlet and outlet ports, a spring closed valve controlling the passageway and opening in response to a predetermined pressure at the control port, a pressure actuated second valve in the passageway, said second valve being urged toward open position by the pressure in the passageway and toward closed position by a variable pressure, and means responsive to the pressure at the control port for varying the pressure acting to close the second valve.

4. A valve for a fluid pressure system comprising a body having inlet, outlet and control ports, a pair of bores in said body, one of said bores being connected to the inlet port and the other of said bores being connected to the outlet and control ports, a passageway establishing communication between the bores, a member slidable in said one bore and constructed and arranged so that in a normal position it laps said passageway to cut off communication between said bores and so that in another position it is ineffective to cut off said communication, said member being responsive to a predetermined pressure at the control port for shifting said member to the latter mentioned position, a movable plunger having a passage therein in said other bore and disposed between the outlet and control ports and constructed and arranged to respond to differential pressures acting on its ends and to control flow through said passageway to said outlet port after said slidable member has been shifted to said latter position, one end of said plunger being subjected to inlet pressure tending to move the plunger to a position permitting such flow, and the other end being subjected to a control port pressure tending to move the plunger to a position normally cutting off said flow, a controller for controlling the pressure acting on said plunger tending to move it to a position for cutting off said flow comprising an adjustable spring biased ball valve seated across the passage in said plunger and responsive to pressure at the control port for unseating the same, a spring biased ball valve constructed and arranged to be seated in the control port for controlling the fluid pressure from the control port acting on said plunger and said first-named ball valve, a pair of slotted members between the ball valves constructed and arranged to normally maintain said last-named ball valve open and to allow said last-named ball valve to seat after said first-named ball valve has been unseated by a second predetermined pressure at the control port, whereby a differential pressure is created across said plunger for moving said plunger to permit said flow.

5. A valve for a fluid pressure system comprising a body having inlet, outlet and control ports, a pair of bores in said body, one of said bores being connected to the inlet port and the other of said bores being connected to the outlet and control ports, a passageway establishing communication between the bores, a member slidable in said one bore and constructed and arranged so that in a normal position it laps said passageway to cut off communication between said bores and so that in another position it is ineffective to cut off said communication, said member being responsive to a predetermined pressure at the control port for shifting said member to the latter mentioned position, a movable plunger having a passage therein in said other bore and disposed between the outlet and control ports and constructed and arranged to respond to differential pressures acting on its ends and to control flow through said passageway to said outlet port after said slidable member has been shifted to said latter position, one end of said plunger being subjected to inlet pressure tending to move the plunger to a position permitting such flow, and the other end being subjected to a control port pressure tending to move the plunger to a position normally cutting off said flow, a controller for controlling the pressure acting on said plunger tending to move it to a position for cutting off said flow comprising a biased ball valve seated across the passage in said plunger and responsive to pressure at the control port for unseating the same, a spring biased ball valve constructed and arranged to be seated in the control port for controlling the pressure from the control port acting on said plunger and said first ball valve, a pair of slotted members between the ball valves constructed and arranged to normally maintain said last-named ball valve open and to allow said last-named ball valve to seat after said first-named ball valve has been unseated by a second predetermined pressure at the control port, whereby a differential pressure is created across said plunger for moving said plunger to permit said flow.

6. A valve for a fluid pressure system comprising a body having inlet, outlet and control ports, a pair of bores in said body, one of said bores being connected to the inlet port and the other of said bores being connected to the outlet and control ports, a passageway establishing communication between the bores, a member slidable in said one bore and constructed and arranged so that in a normal position it laps said passageway to cut off communication between said bores and so that in another position it is ineffective to cut off said communication, said member being responsive to a predetermined pressure at the control port for shifting said member to the latter mentioned position, a movable plunger having a passage therein in said other bore and disposed between the outlet and control ports and constructed and arranged to respond to differential pressures acting on its ends and to control flow through said passageway to said outlet port after said slidable member has been shifted to said latter position, one end of said plunger being subjected to inlet pressure tending to move the plunger to a position permitting such flow, and the other end being subjected to a control port pressure tending to move the plunger to a position normally cutting off said flow, a controller for controlling the pressure acting on said plunger tending to move it to a position for cutting off said flow comprising an adjustable spring biased ball valve seated across the passage in said plunger and responsive to pressure at the control port for unseating the same, a spring biased ball valve constructed and arranged to be seated in the control port for controlling the pressure from the control port acting on said plunger and said first ball valve, the seat of the ball valve located in said control port being larger than the seat of the ball valve which is seated in the plunger, a pair of slotted members between the ball valves constructed and arranged to normally maintain said last-named ball valve open to allow said last-named ball valve to seat after the first-named ball valve has been unseated by a second predetermined pressure at the control port, whereby a differential pressure is created across said plunger for moving said plunger to permit said flow.

7. A valve for a fluid pressure system comprising a body having inlet, outlet and control ports, a pair of bores in said body, one of said bores being connected to the inlet port and the other of said bores being connected to the outlet and control ports, a passageway establishing communication between the bores, a member slidable in said one bore and constructed and arranged so that in a normal position it laps said passageway to cut off communication between said bores and so that in another position it is ineffective to cut off said communication, said member being responsive to a predetermined pressure at the control port for shifting said member to the latter mentioned position, a movable plunger having a passage therein in said other bore and disposed between the outlet and control ports and constructed and arranged to respond to differential pressures acting on its ends and to control flow through said passageway to said outlet port after said slidable member has been shifted to said latter position, one end of said plunger being subjected to inlet pressure tending to move the plunger to a position permitting said flow, and the other end being subjected to a control port pressure tending to move the plunger to a position normally cutting off said flow, a controller for controlling the pressure acting on said plunger tending to move it to a position for cutting off said flow comprising a biased ball valve seated across the passage in said plunger and responsive to pressure at the control port for unseating the same, a spring biased ball valve constructed and arranged to be seated in the control port for controlling the pressure from the control port acting on said plunger and said first ball valve, the seat of the ball valve located in said control port being larger than the seat of the ball valve which is seated in the plunger, a pair of slotted members between the ball valves constructed and arranged to normally maintain said last-named ball valve open and to allow said last-named ball valve to seat after said first-named ball valve has been unseated by a second predetermined pressure at the control port, whereby a differential pressure is created across said plunger for moving said plunger to permit said flow.

8. A valve of the class described comprising a body having inlet, outlet and control ports, a first bore connected to the inlet port, a second bore connected to the outlet and control ports, a passageway establishing communication between the bores, a member slidable in the first bore, a spring engaging said member, said member being constructed and arranged so that in a normal position it is spring urged to lap said passageway to cut off communication between said bores and so that in another position it is ineffective to cut off said communication, said member being responsive to a predetermined pressure at the control port for shifting said member to the latter mentioned position, a seat in said passageway posterior to said first bore, a movable plunger in the second bore so constituted that one of its ends cooperates with the seat to control the flow through said passageway to said outlet after said member has been shifted to said latter position, said plunger having a passage therethrough and constructed and arranged so that its said one end is subjected to inlet port pressure tending to move the plunger off its seat and the other end is subjected to a control port pressure tending to move the plunger normally onto its seat, a first ball valve in the plunger passage normally spring closed, a passageway connecting said other end of the plunger to the control port, a second ball valve in said last-named passageway normally spring urged toward closing said passageway, means between the ball valves constructed and arranged so that when said first ball valve is closed said second ball valve is open to admit control port pressure to said other end of the plunger and when said first valve is open said second valve is closed to cut off control port pressure to said other end, said first ball valve being responsive to control port pressure above a second predetermined value to open said first valve and to allow said second valve to close to dissipate the pressure acting on said other end of the plunger to cause it to be moved off its seat to permit flow.

HAROLD B. SCHULTZ.